:::
United States Patent Office 3,522,008
Patented July 28, 1970

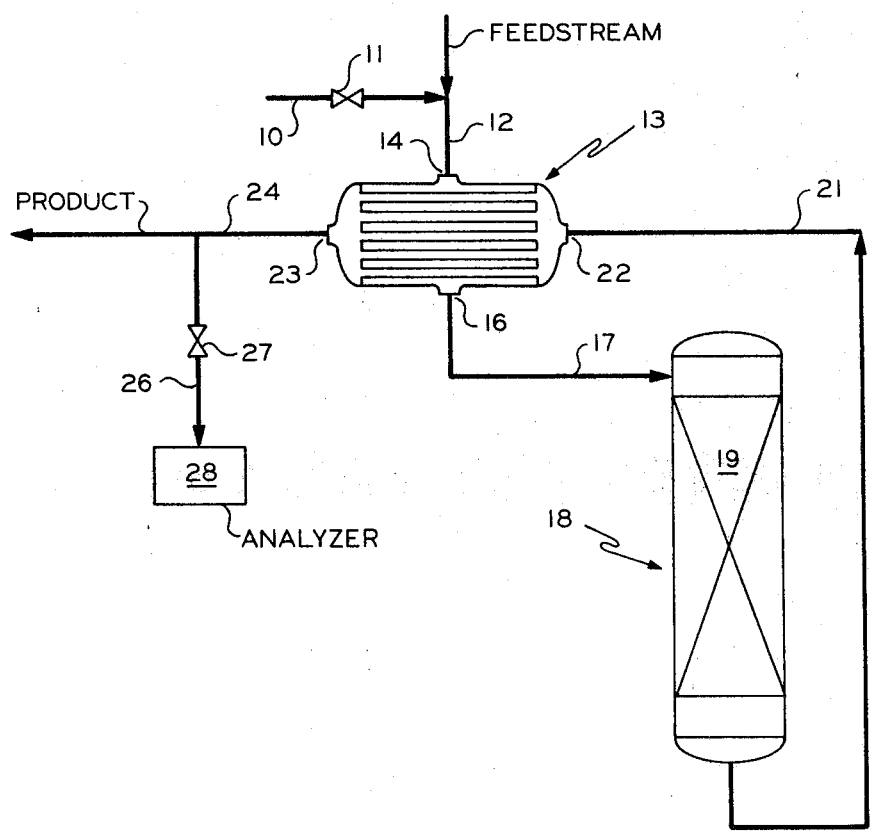

3,522,008
HEAT EXCHANGER LEAK DETECTION
Charles E. Defabaugh and George R. Hettick, Bartlesville, Okla., assignors to Phillips Petroleum Company, a corporation of Delaware
Filed Oct. 13, 1967, Ser. No. 675,202
Int. Cl. G01n *21/16;* G01m *3/20*
U.S. Cl. 23—230                                4 Claims

ABSTRACT OF THE DISCLOSURE

Leaks in apparatus for indirect heat exchange between a feed stream flowing to and a product stream flowing from a catalytic reaction zone are detected by adding a compound selected from the group consisting of lithium decanoate and cobalt naphthenate to the feed upstream of the heat exchange apparatus and analyzing the product stream downstream from the heat exchange apparatus for the presence of said compound.

---

This invention relates to a method of detecting leaks in heat exchangers. In one aspect the invention relates to a method for determining the magnitude of a leak in a heat exchanger.

In many chemical processes, a feed stream is indirectly heat exchanged with the product stream from the process to conserve heat. In indirect heat exchange a stream of a first fluid is passed through a confined passageway disposed within another confined passageway through which a stream of a second fluid is flowing. The shell and tube heat exchanger is one well known type of indirect heat exchange apparatus. This type of heat exchanger comprises a nest or bundle of tubes supported on tube sheets and disposed within a shell. Leaks sometimes occur in one of the tubes or the tube sheets with the result that one fluid leaks into and contaminates the other fluid. This leakage is especially detrimental in a system where at least a portion of the product stream is passed in heat exchange with at least a portion of the feed. Certain product streams have narrow specifications as to purity and cannot tolerate such contamination.

Known methods of detecting heat exchanger leaks include "cold" exchanger testing and stream analysis before and after heat exchange. The cold exchanger tests require shutdown of the apparatus and repressuring with water or other fluid. This type of test does not always indicate the leaks, which at operating conditions are large enough to require repairs. The comparative analysis method of leak detection requires simultaneous withdrawal of multiple samples under conditions which are hazardous to personnel and contains inherent inaccuracies. By the practice of the invention, heat exchanger leaks are detected without necessitating shutdown of the apparatus or multiple sample withdrawal. A single analysis, which can be run continuously if desired, provides for the detection of leaks and determination of magnitude of leaks in a feed-product heat exchange apparatus.

Accordingly it is an object of the invention to provide an improved method of detecting leaks in heat exchange apparatus.

Another object of the invention is to test a heat exchanger for leaks under operating conditions.

Another object of the invention is to provide a simple and inexpensive method of determining the magnitude of leaks in a heat exchanger.

These and other object will be apparent to one skilled in the art upon consideration of the disclosure, drawings, and appended claims.

The figure is a schematic representation of one embodiment of the invention.

According to the invention, in a process wherein a feed stream to a catalyic reaction zone is passed through a heat exchanger in indirect heat exchange with a product stream, under a lower pressure, from the catalytic reaction zone, there is provided a method of detecting leaks in the heat exchanger comprising adding a compound to the feed upstream of the heat exchanger, the compound being one which is reacted out at least in part in the reaction zone and which does not poison the catalyst in the reaction zone in the amount added, sampling the product stream downstream of the heat exchanger and analyzing the sample for the compound. If the compound is removed from the fluid stream by the catalytic reaction, any compound in the analyzed sample results from leakage of the feed into the product during heat exchange. The quantity of the compound in the analyzed product is proportional to the magnitude of the leak in the heat exchanger. If only a portion of the added compound is adsorbed on the catalyst, a predetermined amount of additive will be in the product. Any increase in this known amount indicates leakage and the magnitude of increase is proportional to the extent of leakage. Any compound which is removed, at least in part, from the fluid stream during the catalytic reaction can be used. For example in a reforming process, compounds such as hydrogen chloride, chloroalkanes, chloroalkenes, or arylchlorides can be added and the effluent can be analyzed for chloride content after heat exchange.

The invention can be utilized for detecting leaks in heat exchange apparatus which is utilized in conjunction with both exothermic and endothermic reactions. Thus the indirect heat exchange of feed and product includes transfer of heat both to and from the feed stream. The method can be used continuously or intermittently.

In one embodiment of the invention, lithium decanoate is added upstream of the heat exchanger to a cool hydrocarbon feed flowing to a reforming reaction which employs a platinum or alumina catalyst. The lithium compound is deposited out on the catalyst bed during the reaction and does not affect catalyst activity. After heat exchange with the feed stream a sample stream is split from the product stream and continuously analyzed for lithium by means of an atomic absorption spectrophotometer.

The metal compound, preferably an organometal compound, added to the feed stream must be one which is reacted out or adsorbed on the catalyst and which does not, in the amount added, adversely affect catalyst activity, therefore the particular catalyst used in the reaction will determine the particular compound to be added to the feed. Various metal compounds which can be used are among those 38 listed in the brochure: "Model 303 Atomic Absorption Spectrophotometer," not dated, of The Perkin-Elmer Corporation, Instrument Division, Norwalk, Conn. Suitable metal compounds for use in reactions employing catalysts such as silica-alumina, platinum or palladium on alumina, cobalt-molybdate on alumina and nickel on kieselguhr include lithium deconate and cobalt naphthenate. These types of catalysts are used in hydrocarbon reforming, cracking, hydrocracking, desulfurization, alkylation, isomerization and like processes, these processes being ones which often utilize feed-product heat exchange to conserve heat energy.

The amount of compound added to the feed stream is dependent upon the tolerance of the catalyst and the sensitivity of the particular analytical method used in the invention. Usually sufficient compound is added so that at least about 25 to 50 parts per billion (p.p.b.) of the metal is in the higher pressure stream charged to the heat exchanger. More, of course, can be used, as desired. Routine tests will show the optimum for any particular operation. Any conventional analytical method, qualitative or quantitative, can be used. The analysis can be made at predetermined time intervals or continuously if product purity is critical. It is preferred to use flame photometry, polarographic means, atomic absorption, spectrophotometry, emission spectroscopy, X-ray fluorescence, X-ray and emission spectrographic methods, and like methods of analysis because the instruments used in these methods, once calibrated, provide a quick determination of trace quantities present in the sample. For example, an atomic absorption spectrophotometer can be employed to determine as low as five parts per billion of lithium present in a sample. The use of such a highly sensitive instrument permits the addition of trace quantities of the compound. Such small quantities allow the use of compounds which otherwise would have a deleterious effect on the catalyst.

In certain processes, the sample stream of heavier hydrocarbonaceous product is diluted with a solvent in order to allow proper analysis. In particular, when analyzing reformed gasoline with an atomic adsorption spectrophotometer a very smokey flame was obtained; the produced carbon particles interfered with passage of light through the flame resulting in reduced sensitivity. The gasoline was diluted 50/50 with methyl isobutyl ketone and sensitivity was increased to the desired level.

Referring now to the drawing, a metal compound in a suitable carrier fluid, such as the feed material itself, is passed through conduit 10 and valve 11 in a controlled quantity and admixed with the fluid feed stream passing through conduit 12. The metal-containing feed stream is introduced into the shell side of heat exchanger 13 via inlet 14. After indirect heat exchange with the fluid passing through the tubes, the metal containing feed is removed from heat exchanger 13 through outlet 16 and passed via conduit 17 to a reactor 18.

The feed stream is reacted and the metal compound reacted out on catalyst bed 19 as the fluid passes downwardly through the reactor. A cylindrical downflow fixed bed catalytic reactor has been illustrated but other types of reactors and methods of catalyst contact, such as fluidized bed reactors can be used.

The product, at lower pressure than the feed, is recovered from reactor 18 via conduit 21 and introduced into the tubes of heat exchanger 13 through inlet 22. After indirect heat exchange with the feed flowing through the shell, the product stream is removed from heat exchanger 13 via outlet 23 and passed through conduit 24 to storage or further processing steps.

A small sample stream is split from the product stream flowing in conduit 24 and is passed through a sample conduit 26 and valve 27 to an analyzer 28 wherein the sample is analyzed qualitatively or quantitatively for the metal compound. The sampling can be intermittent or continuous. The analytical apparatus can be fully automated if desired.

The fluid product stream flowing through conduit 21 and the tubes of heat exchanger 13 is at a lower pressure than the feed stream flowing through the shell and conduits 12 and 17 because of the pressure drop across reactor 18. Because of this pressure differential, leaks or mechanical failures in the heat exchange apparatus will result in flow of feed into the product; this flow being indicated by the presence of the metal compound in the product. When the metal compound is added to the feed stream in known amounts and the flow rates of both streams are known, a quantitative analysis of the metal compound present in the sample provides the necessary data for calculating the magnitude or rate of leaking in the heat exchange apparatus.

Of course, the feed can be on the tube side and the product on the shell side. Other type indirect heat exchangers can be used. The invention is not limited to analyzing for a metal compound as described, in conjunction with the drawing; any compound which is removed at least in part from the stream during reaction, such as organic chlorides, can be used. Likewise, the invention is not limited to any particular mechanism of removing, at least in part, the compound from the stream.

By the practice of the invention, leaks are detected quickly and easily, allowing repairs before there is an economic loss.

Reasonable modification and variation are within the scope of the invention which sets forth a novel method for detecting leaks in heat exchange apparatus.

That which is claimed is:

1. In a process wherein a fluid feed stream to a catalytic reaction zone is passed through a heat exchanger in indirect heat exchange with a fluid product stream under a lesser pressure from said catalytic reaction zone, the method of detecting a leak in said heat exchanger comprising:

adding a compound a selected from the group consisting of lithium decanoate and cobalt naphthenate to said feed stream prior to passing through said heat exchanger, said compound being one which is removed at least in part from said fluid stream during the catalytic reaction and which does not adversely affect the activity of the catalyst contained within the reaction zone in the amount added;

sampling said product stream after it has passed through said heat exchanger; and analyzing said sample for said compound to detect leakage of said feed stream into said product stream.

2. The method of claim 1 including the step of diluting said sample with a solvent prior to said analyzing step.

3. The method of claim 1 wherein said sample is analyzed by atomic adsorption spectrophotometry.

4. The method of claim 1 wherein the catalyst comprises silica-alumina, platinum or palladium on alumina, cobalt molybdate on alumina or nickel on kieselguhr.

References Cited

UNITED STATES PATENTS 3,087,064    4/1963    Curtice.

OTHER REFERENCES

D. E. HULL, Ind. Eng. Chem., 50, 199–200 (1958).

MORRIS O. WOLK, Primary Examiner

S. MARANTZ, Assistant Examiner

U.S. Cl. X.R.

165—70; 252—408